US006286737B1

(12) United States Patent
Whitley (10) Patent No.: US 6,286,737 B1
(45) Date of Patent: Sep. 11, 2001

(54) ATTACHMENT DEVICE FOR MOBILE PHONE

(75) Inventor: Kevin James Whitley, South Hurstville (AU)

(73) Assignee: Amtel Technology Pty. Ltd., Botany (AU)

( * ) Notice: Subject to any disclaimer, the term of this patent is extended or adjusted under 35 U.S.C. 154(b) by 0 days.

(21) Appl. No.: 09/509,420

(22) PCT Filed: Aug. 5, 1999

(86) PCT No.: PCT/AU99/00633

§ 371 Date: Mar. 27, 2000

§ 102(e) Date: Mar. 27, 2000

(87) PCT Pub. No.: WO00/08882

PCT Pub. Date: Feb. 17, 2000

(30) Foreign Application Priority Data

Aug. 7, 1998 (AU) .................................................. PP 5155
Nov. 6, 1998 (AU) .................................................. PP 6970

(51) Int. Cl.[7] ...................................................... A45F 5/00
(52) U.S. Cl. .......................... 224/271; 224/196; 224/272; 224/669; 224/930; 24/3.12; 24/597
(58) Field of Search ................................ 224/195, 196, 224/197, 198, 199, 247, 249, 269, 271, 272, 665–672, 930; 24/3.11, 3.12, 594, 595, 597

(56) References Cited

U.S. PATENT DOCUMENTS 5,620,120 * 4/1997 Tien ........................................ 224/199
5,730,342 * 3/1998 Tien ........................................ 224/271
5,779,115 * 7/1998 Parkas et al. ......................... 224/272
5,850,996 * 12/1998 Liang .............................. 224/272 X
6,098,858 * 8/2000 Laugesen ............................. 224/197

FOREIGN PATENT DOCUMENTS

36890/93  10/1993  (AU) .
2103527   2/1994   (CA) .
96/16499  5/1996   (WO) .

* cited by examiner

Primary Examiner—Stephen K. Cronin
(74) Attorney, Agent, or Firm—Smith-Hill and Bedell (57) ABSTRACT

A device (10) is for the attachment of mobile phones or like apparatus to a belt or other garment of a user. The device (10) includes a receptacle body (12) and corresponding flanged lug fastener (11) which is attached to the mobile phone or like apparatus. The receptable body (12) is adapted to be attached to a belt or the like by means of a clip (14) positioned on the receptable body (12). The body (12) has an opening (25) located at its top side portion into which the flange of the lug fastener (11) is received with the lug fastener (11) extending through a slot (27) on the receptable body (12) communicating with the opening (25) such that the mobile phone or like apparatus is positioned outside and adjacent the receptacle body (12) when the lug fastener (11) is received within the receptacle body (12). The device (10) further includes a locking means within the receptacle body (12), the locking means having a moveable carriage (29) movable between a receiving position and a holding position, the carriage (29) receiving the flange of the lug fastener (11) when the moveable carriage (29) is in the receiving position. The carriage (29) has holding means to capture and hold the flange of the lug fastener (11) within the carriage (29) when the moveable carriage is moved into the holding position.

6 Claims, 8 Drawing Sheets

ATTACHMENT DEVICE FOR MOBILE PHONE

The present invention relates to devices for the attachment of mobile phones or like apparatus to a belt or other garment of a user and, in particular, to a device which ensures that the mobile phone or other apparatus cannot be inadvertently dislodged.

BACKGROUND OF THE INVENTION

It is very common for people to carry mobile phones and other like communication apparatus such as pagers etc clipped to their belt. The most common method of clipping a mobile phone to ones belt is by inserting the phone into a protective case which has a rigid spring operated clip attached thereto. Other methods use rigid clips which are actually attached or integral to the phone itself.

These methods of clipping mobile phones to belts have the disadvantage that as the clips are rigidly connected to the phone or protective case, the phone can be inadvertently dislodged from the belt due to the movement of the person, sitting down, walking, etc. as the phone can be knocked or rotated by the person's leg. There is also the disadvantage that the use of such clips can cause discomfort as the phone is rigidly set against the person's waist.

Another form of attachment device for a mobile phone is disclosed in U.S. Pat. No. 5,597,102. This specification describes a device being the combination of a circular flanged lug attached to the back of a phone, the lug being received within a slotted receptacle whereby the flanges of the lug are held within the receptacle while the neck of the lug extends through the slot. The circular flanged lug is slid into an opening of the receptacle which is clipped to a person's belt. The lug is supposedly captured within the receptacle by a spring loaded projection acting on the lug, and is able to rotate whilst captured. This ability to rotate overcomes the disadvantages with regard to the fixed clip of the above described prior art but introduces a problem of the phone being inadvertently dislodged by the rotational forces applied to the phone while it is being carried in this manner. It has been found that the device as described in the specification allows the phone to be easily dislodged as the rotational movement which was the object of that invention introduces forces which move the phone within the receptacle which allows the rotational movement thereof.

Therefore it is desirous that for an attachment device be provided which allows rotational motion of the phone and which overcomes the problem associated with the afore-described device by preventing inadvertent dislodgement of the phone from the person's body. It is also desirable for the provision of a stop means which can lock the phone into a number of different orientations preventing the free rotational movement thereof.

OBJECT OF THE INVENTION

It is an object of the present invention to provide an improved device for the attachment of mobile phones or like apparatus to a belt or other garment of a user which substantially overcomes or ameliorates the above mentioned disadvantages. At the very least the invention provides an alternative to previously proposed attachment devices.

DISCLOSURE OF THE INVENTION

According to the present invention there is provided a device for the attachment of mobile phones or like apparatus to a belt or other garment of a user, said device including a receptacle body and corresponding flanged lug fastener which is attached to the mobile phone or like apparatus, said receptacle being adapted to be attached to a belt or the like by means of a clip means positioned on the receptacle body, said body having an opening located at its top side portion into which the flange of said lug fastener is received with the lug fastener extending through a slot on said receptacle body communicating with said opening such that said mobile phone or like apparatus is positioned outside and adjacent said receptacle body when said lug fastener is received within said receptacle body, wherein said device further includes a locking means within said receptacle body, said locking means having a moveable carriage movable between a receiving position and a holding position, said carriage receiving said flange of said lug fastener when said moveable carriage is in said receiving position, and said carriage having holding means to capture and hold said flange of said lug fastener within said carriage when said moveable carriage is moved into said holding position.

Preferably, the locking means further includes a release means which releases the moveable carriage from the holding position. The carriage is preferably locked in the holding position by a flange and stop means which engage when in the holding position, the carriage being released by the release means which is preferably an external button communicating through an opening in the body, the release means being manipulated to force the flange and stop means from their engagement.

In one preferred form of the invention, the holding means is a pair of pliable arms or articulated arms which are part of the carriage, the arms being forced around the lug fastener to prevent the lug fastener from moving out of the carriage. The free ends of the arms are forced around the lug fastener as the carriage moves from the receiving position to the holding position due to pins in the arms moving within a slotted track in the receptacle body.

In one preferred form of the invention, the lug fastener is circular and is able to rotate within the carriage when held in the holding position.

In another preferred form of the invention, the carriage has holding means to capture and hold the flange of said lug fastener within the carriage and when said the moveable carriage is moved into the holding position, the holding means prevents the flange from rotating.

Preferably the flange and hence the phone attached thereto can have a number of different orientations when held by the carriage. In a preferred form, the different orientations are discrete positions 90° from each other.

In the preferred form of the invention, the flange of the lug fastener is substantially circular with indents positioned 90° from each other and the holding means is a pair of pliable arms which are part of the carriage, the arms having protrusions which engage with the indents in the flange of the lug fastener thus restricting rotational movement of the lug fastener as well as restricting the lug fastener from moving out of the carriage. The free ends of the arms are forced around the lug fastener as the carriage moves from the receiving position to the holding position due to pins in the arms moving within a slotted track in the receptacle body, thus capturing the lug fastener.

BRIEF DESCRIPTION OF THE DRAWINGS

One embodiment of the present invention will now be described with reference to the drawings in which.

BEST MODE OF CARRYING OUT THE INVENTION

A device 10, as illustrated in the FIGS. 1 to 14 of the drawings, is used for the attachment of a mobile phone (not illustrated) or like apparatus to a belt (not illustrated) or other garment of a user when the user is carrying their mobile phone on their person. The mobile phone is attached to the device 10 by means of a flanged lug fastener 11, as shown as a phantom circle in FIGS. 1 and 2, being received by the device 10. The lug is not shown in any detail as it is a standard type fastening lug extending from the case of the mobile phone. In this preferred embodiment, the flanged lug fastener 11 has a circular flange and is connected to the rear of the mobile phone in any suitable manner. The lug can be removable or it can be integral with the case of the mobile phone.

The device 10 includes a receptacle body 12 into which the flanged lug fastener 11 is received and locked into place enabling it to rotate while so locked. The receptacle body 12 has on its rear 13 a spring clip 14 which is attachable to a belt or like piece of clothing. The spring clip 14 includes a folded spring 15 and an attachment clip portion 16, the spring 15 having one leaf 1 7 connected to the rear 13 of the body 12 with the other leaf 18 being connected to the attachment clip portion 16 of the clip 14. The leaf 17 is connected to the rear 13 of the body 12 by means of mating holes 19 and pins 20 in and on the leaf 17 and rear 13 of the body 12 respectively, while the other leaf 18 is received in a pair of guides 21 on the front side of the attachment clip portion 16 with a pin 22 on the attachment clip portion 16 mating with a hole 23 on the other leaf 18.

Figure 1:
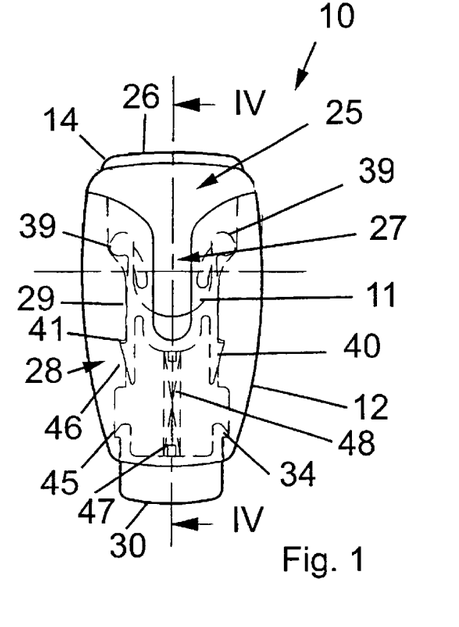
FIG. 1 is an front view of a device according to the preferred embodiment of the invention, showing the internal components in phantom, in its ready for use mode.
Figure 3:
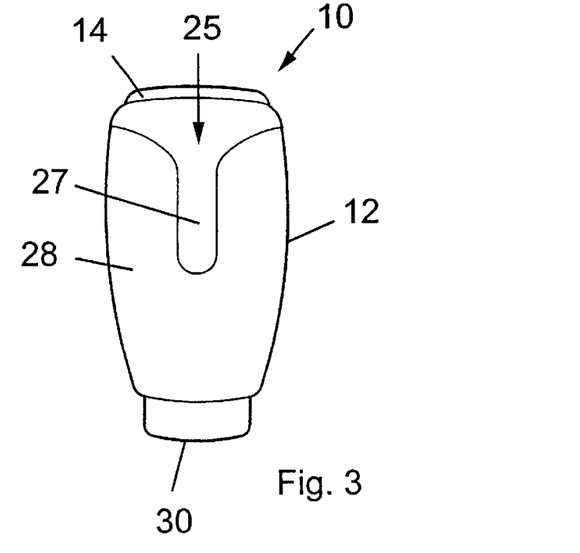
FIG. 3 is a front view of the device of FIG. 1 without showing the internal components.
Figure 4:
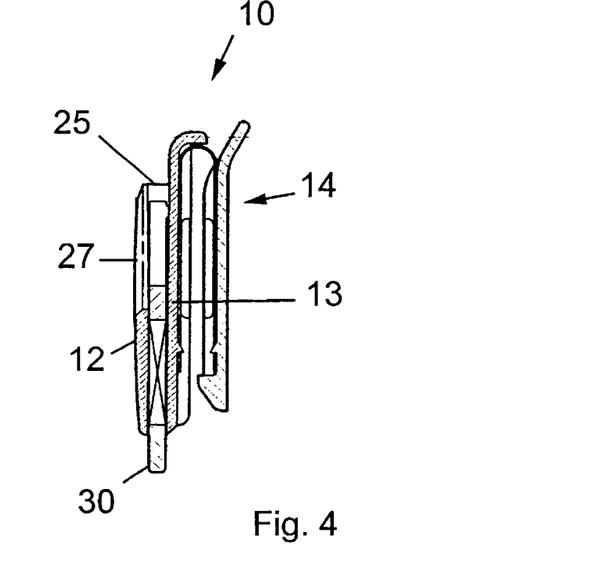
FIG. 4 is a cross sectional view along the lines IV—IV of FIG. 1.
Figure 5:
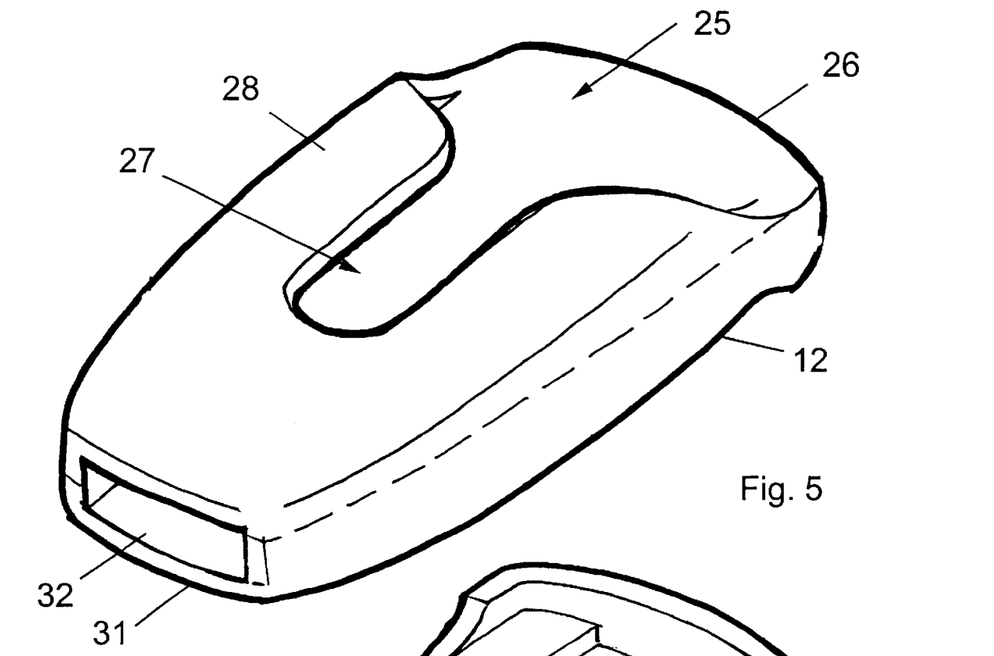
FIG. 5 is a front perspective view of a receptacle body of the device of FIG. 1.

The receptacle body 12 has an opening 25 at its top 26 into which the lug fastener 11 is received. The flange of the lug fastener 11 is what is received within the opening 25 while the stem (not illustrated) extends through a slot 27 on the front 28 of the body 12. The slot communicates with the opening 25 and therefore the lug fastener 11 is able to be slid into the body 12 with the flange captured behind the front 28 of the body 12 and therefore can only be lifted out the way it came in. The circular nature of the lug fastener 12 allows it to be inserted in any orientation.

Figure 7:
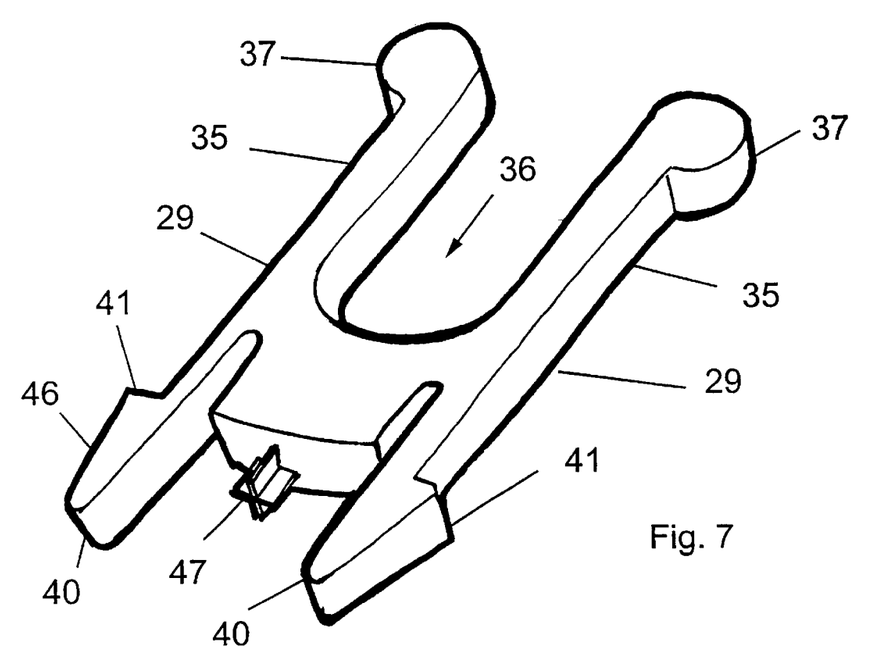
FIG. 7 is a front perspective view of a carriage of the device of FIG. 1.
Figure 9:
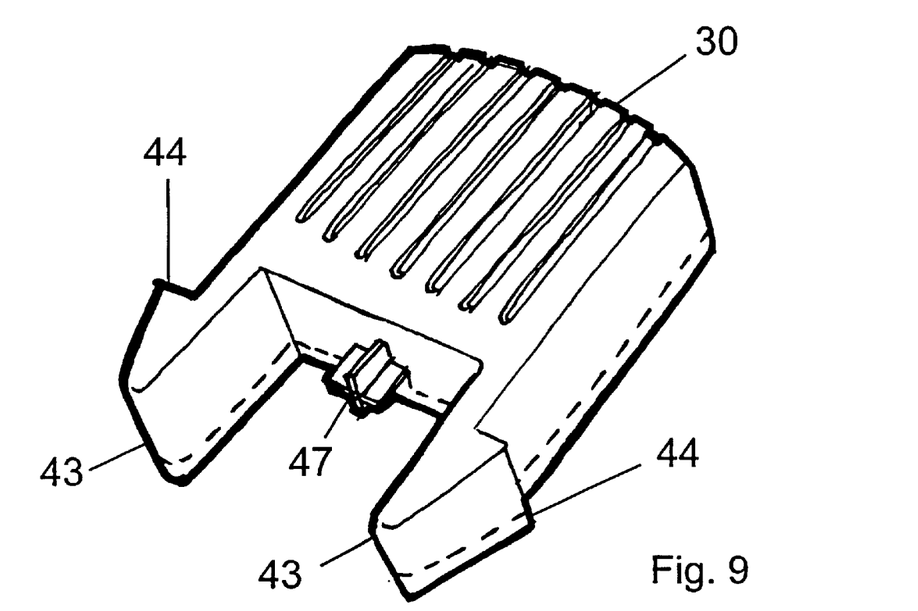
FIG. 9 is a front perspective view of a release button of the device of FIG. 1.
Figure 10:
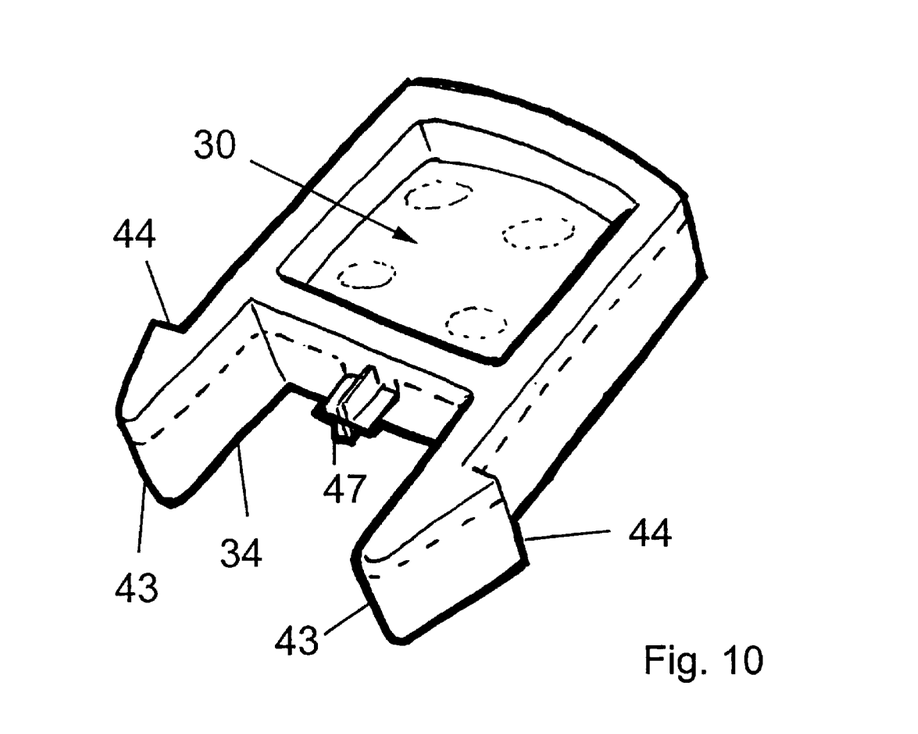
FIG. 10 is a rear perspective view of the release button of FIG. 9.
Figure 11:
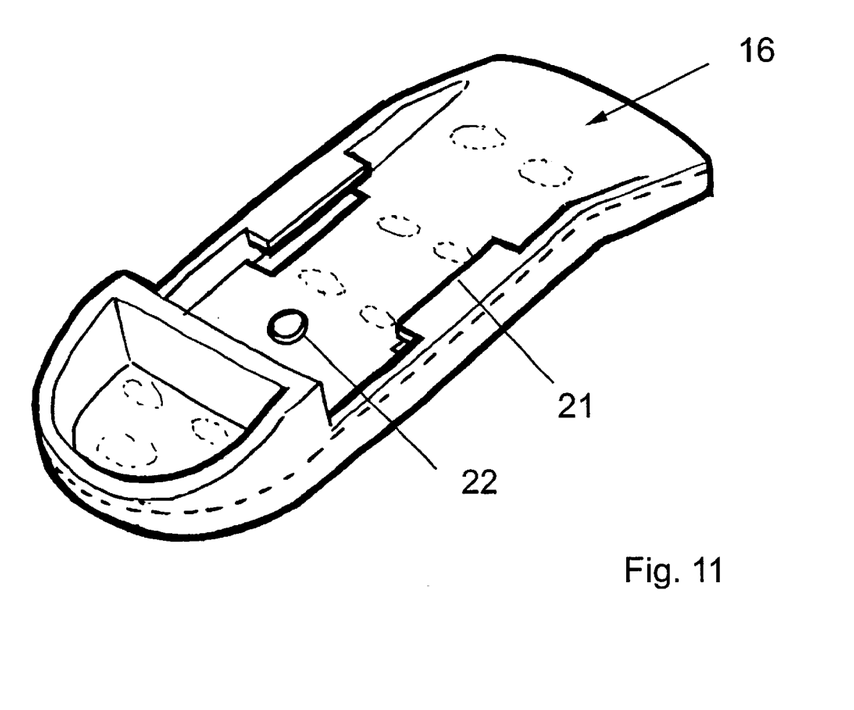
FIG. 11 is a front perspective view of a clip of the device of FIG. 1.
Figure 12:
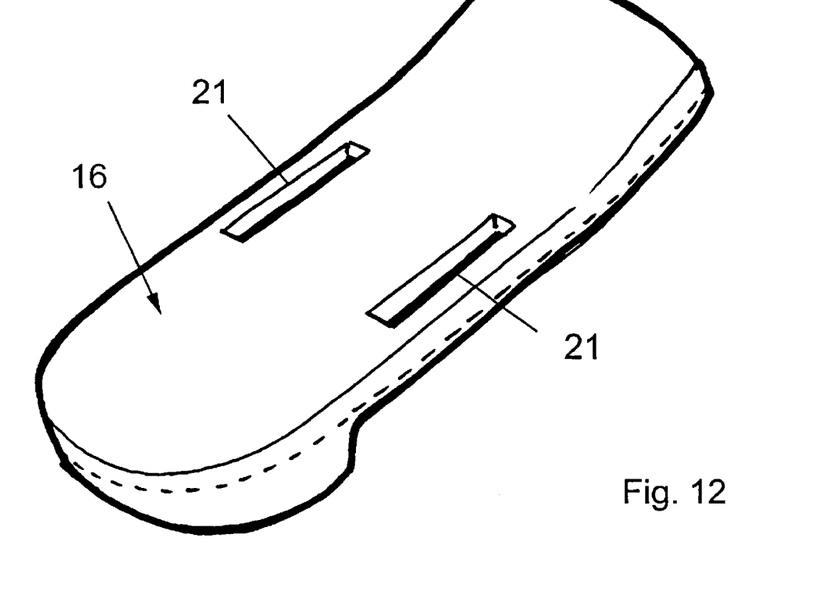
FIG. 12 is a rear perspective view of the clip of FIG. 11.
Figure 13:
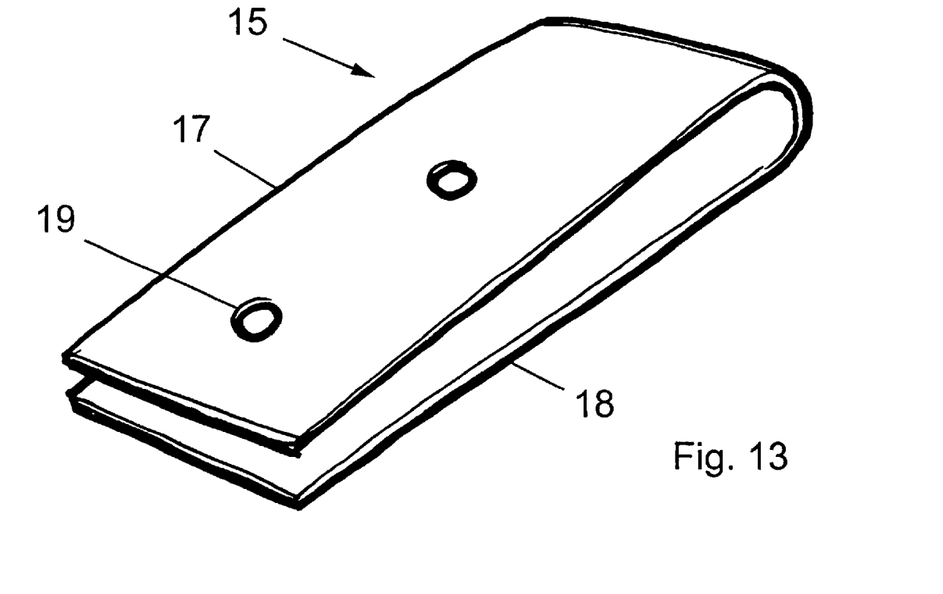
FIG. 13 is a front perspective view of a spring of the device of FIG. 1.
Figure 14:
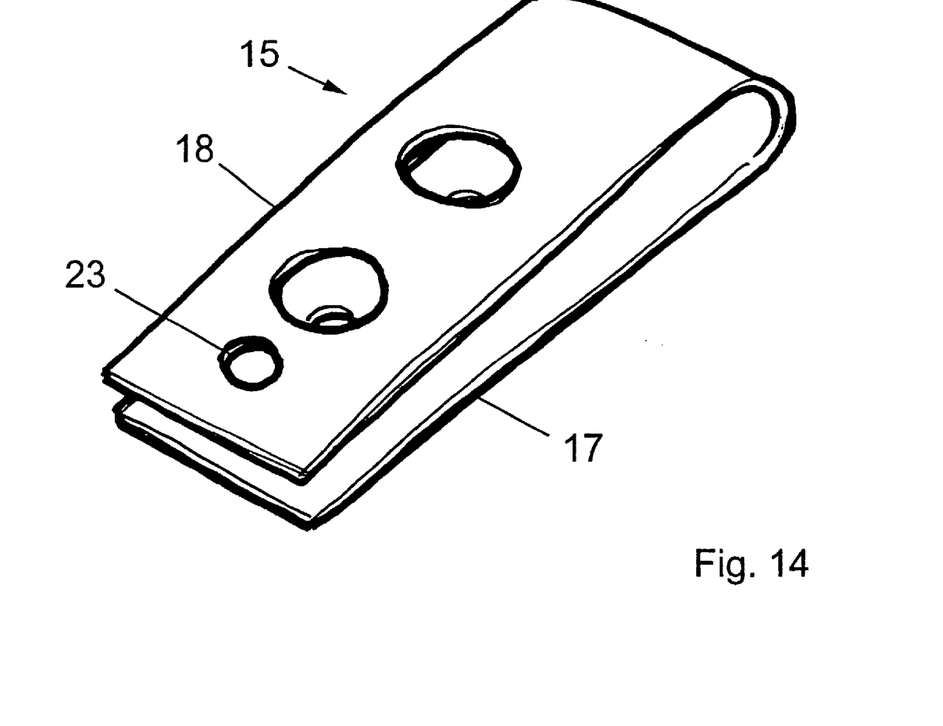
FIG. 14 is a rear perspective view of the spring of FIG. 13.

A moveable carriage 29 and release button 30 are located within the receptacle body 12. The moveable carriage 29 is located totally within the body 12 and is reciprocally movable between a receiving position and a holding position while the release button 30 is partially located within the body 12 with a button portion 31 extending out from an aperture 32 in the bottom 33 of the body 12 with a release mechanism portion 34 being located within the body 12.

Figure 6:
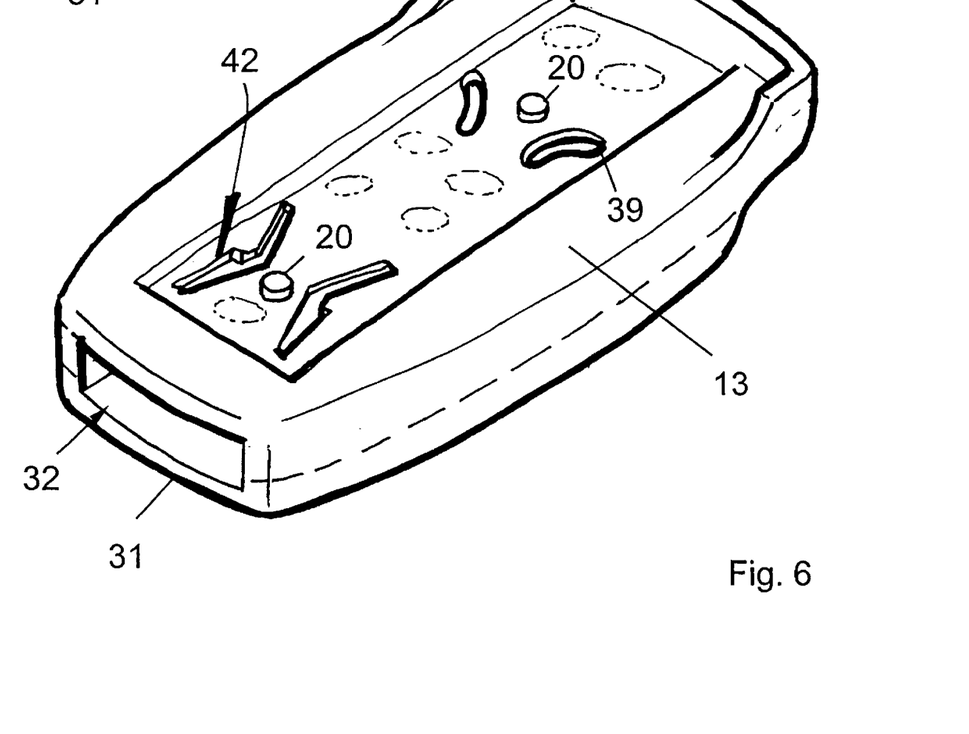
FIG. 6 is a rear perspective view of the receptacle body of FIG. 5.
Figure 8:
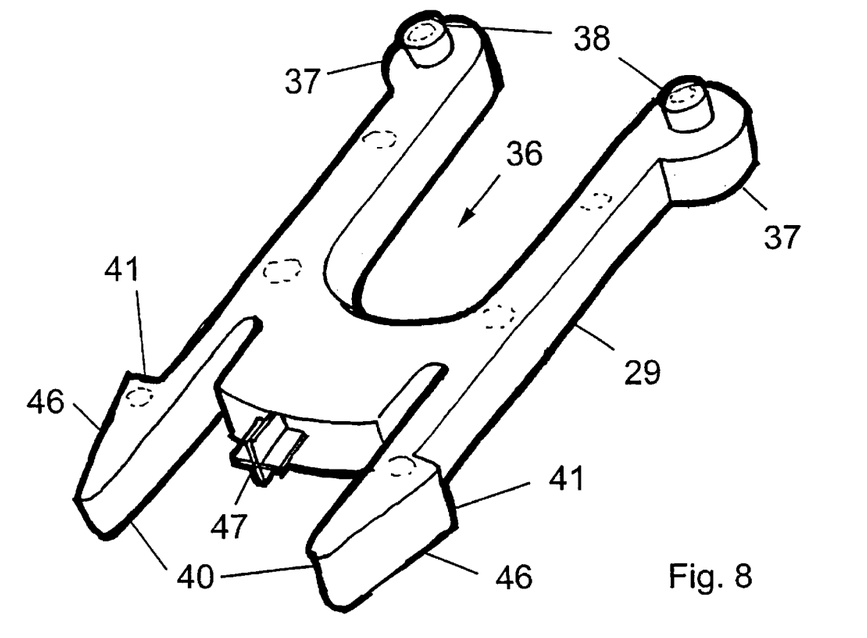
FIG. 8 is a rear perspective view of the carriage of FIG. 7.

The moveable carriage 29 has a pair of holding arms 35 extending upwardly, the arms 35 effectively forming a recess 36 between their free ends 37 into which the lug fastener 11 is received. Each of the arms 35 have a pin 38 located at their free end 37, the pin 38 facing rearwardly and being located within a slotted guide 39 in the rear portion 13 of the body 12. The slotted guides 39 are curved towards the centre line of the rear portion 13 thus forcing the free ends 37 of the arms 35 towards each other as the carriage is moved downwardly from the receiving position to the holding position. The arms 35 are preferably pliable but can take the form of articulated arms.

The carriage 29 also has a pair of relatively stiff but pliable lugs 40 extending downwardly along its sides with the lugs 40 having an outwardly facing flange 41 which mate with a pair of inwardly facing stops 42 located in the body 12 extending from the internal rear surface.

The release button 30 also has a pair of lugs 43 which extend upwardly from the button portion 31 with the lugs 43 interacting with the lugs 40 of the carriage 29. The lugs 43 each have an outwardly facing flange 44 which mates with a corresponding stop 45 in the body 12. These stops 45 prevent the release button from inadvertently coming out of the body 12 through aperture 32. The lugs 43 when moved upwardly force the lugs 40 towards each other as the lugs 43 move along a ramp 46 on the outward face of the lugs 40. This motion releases the flanges 41 from the stops 42 thus releasing the carriage 29 from the holding position. A pair of projections 47 on the carriage 29 and release button 30 respectively hold a coil spring 48 which extends between the carriage 29 and release button 30 which in turn urges the button 30 in the downwards direction.

In use the lug fastener 11 is slid into the opening 25 of the body 12 with the stem of the lug fastener extending through the slot 27 while the device is attached to a belt or the like. The flange of the lug fastener 11 is effectively received within the recess 36 between the arms 35 and abutting against the carriage 29 which forces the carriage 29 downwards. As the carriage 29 moves in this direction, the lugs 40 move towards the centre line due to the ramp 46 acting against the stop 42 until reaching the holding position when the flanges 41 are held by the stops 42 and thereby prevented from moving upwards.

Figure 2:
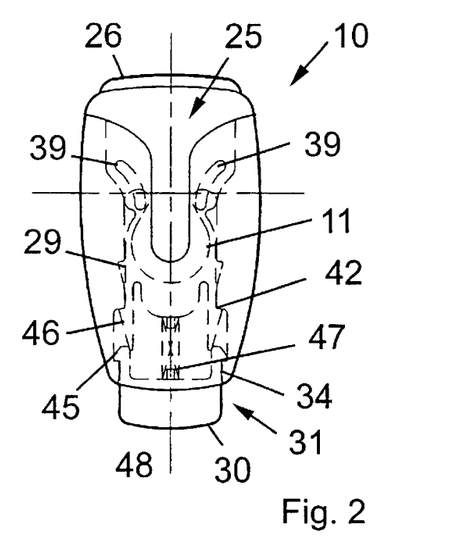
FIG. 2 is a front view of a device of FIG. 1 also showing the internal components in phantom, in its use mode without showing the mobile phones or like apparatus for clarity reasons.

At the same time as the carriage 29 is being locked into the holding position, the free ends 37 of the arms 35 are move by the action of the pins 38 in the slotted guides 39 thus effectively wrapping around the flange of the lug fastener 11 as seen in FIG. 2. Thus the lug fastener 11 is held in the device 10 and the carriage 29 which is holding it is locked into this holding position. The lug fastener 11 is only able to rotate while it is in this holding position.

To release the lug fastener 11, and hence the mobile phone from the device 10, the release button 30 is pushed against the action of the spring 48 forcing the lugs 40 towards each other as described above. This releases the carriage 29 from the holding position and the action of the spring 48 forces the carriage 29, and hence the phone, upwards with the lug fastener 11 being able to be removed from the device 10.

Figure 15:
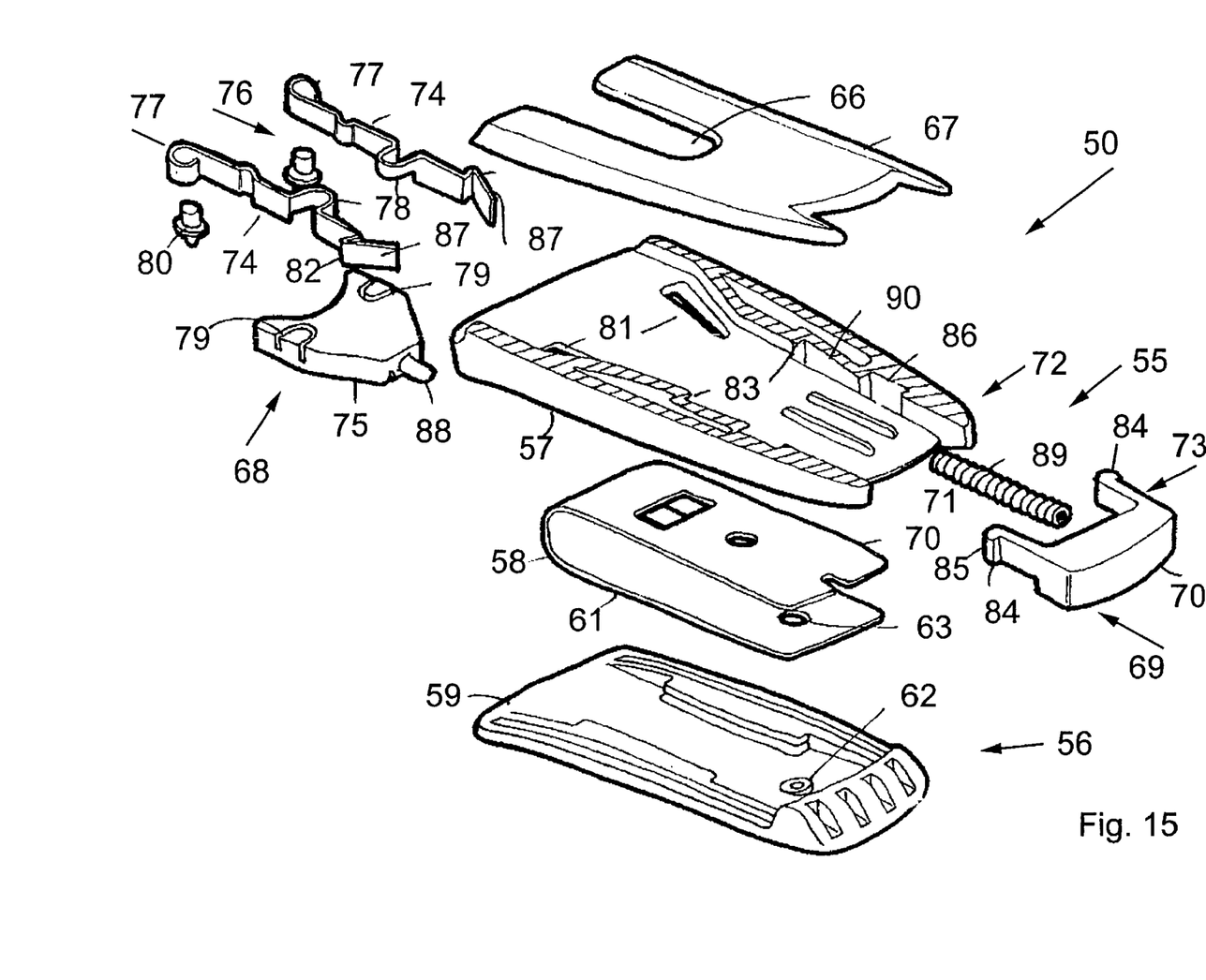
FIG. 15 is an exploded perspective view of a device according to another preferred embodiment of the invention.
Figure 16:
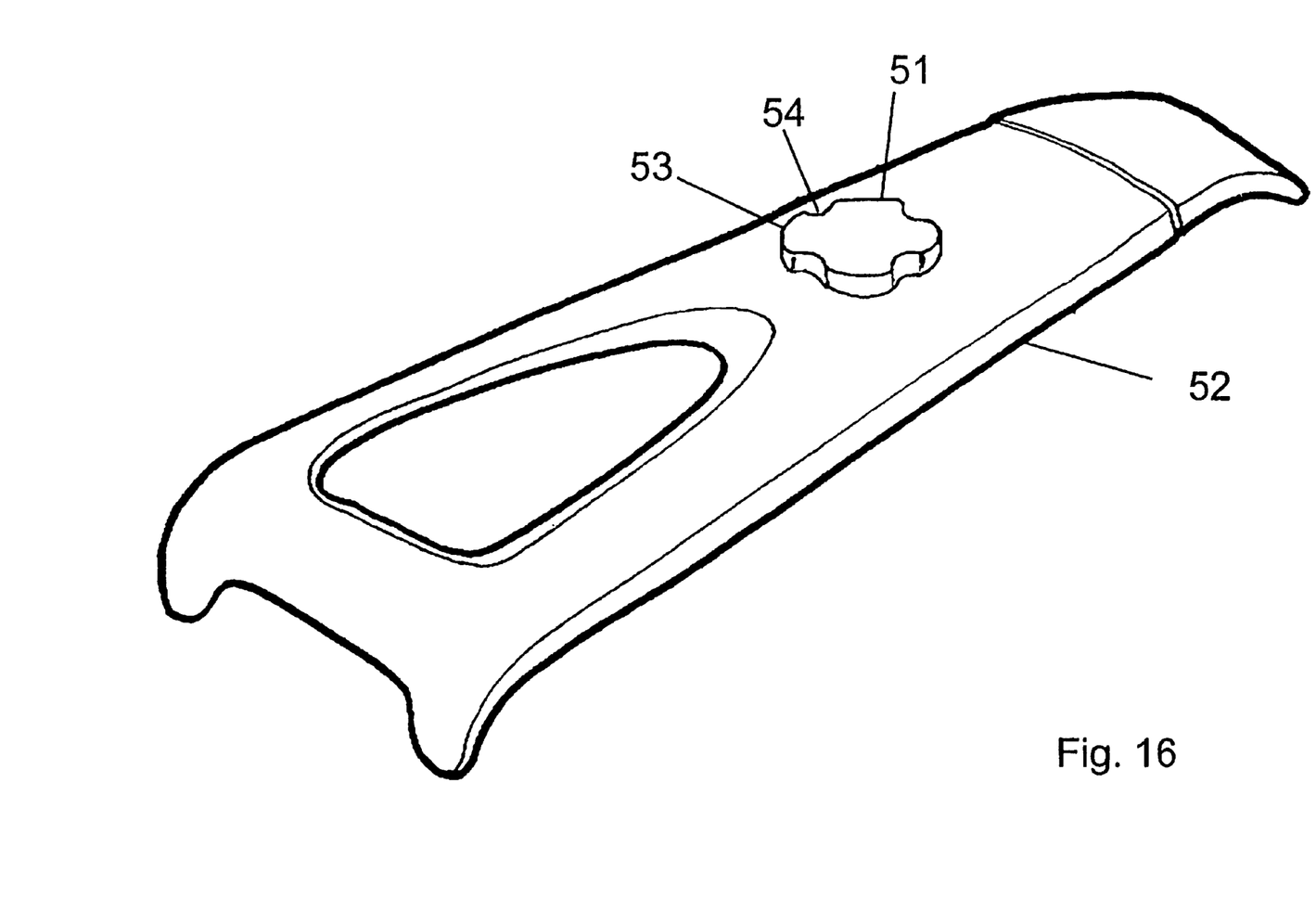
FIG. 16 is a perspective view of a fastener used with the device of FIG. 15.

A device 50 in combination with a lug fastener 51, as illustrated in FIGS. 15 and 16 of the drawings, is used for the attachment of a Motorola STARTAC"V"® mobile phone (not illustrated) or like apparatus to a belt (not illustrated) or other garment of a user when the user is carrying their mobile phone on their person. The mobile phone is attached to the device 50 by means of the flanged lug fastener 51 (FIG. 16) being received by the device 50.

The lug fastener 51 is shown positioned on a device 52 which is able to be clipped to a face of a mobile phone. In this embodiment, the flanged lug fastener 51 is a substantially circular flange 53 having four indents 54 positioned 90° from each other. The lug fastener 51 can be removable or it can be integral with the case of the mobile phone.

The device 50 includes a receptacle body 55 into which the flanged lug fastener 51 is received and locked into place restricting rotation while so locked. The receptacle body 55 has a spring clip 56 on its rear 57, the spring clip 56 being attachable to a belt or like piece of clothing. The spring clip 56 includes a folded spring 58 and an attachment clip portion 59, the spring 58 having one leaf 60 connected to the rear 57 of the body 55 with the other leaf 61 being connected to the attachment clip portion 59 of the clip 56. The leaf 60 is connected to the rear 57 of the body 55 by means of mating pins 72 and holes 73 in and on the leafs 60 and 6 the rear 57 of the body 55 and attachment clip portion 58, respectively.

The receptacle body 55 has an opening 64 at its top 65 into which the lug fastener 51 is received. The flange 53 of the lug fastener 51 is received within the opening 64 while the stem (not illustrated) extends through a slot 66 on the front 67 of the body 55. The slot 66 communicates with the opening 64 and therefore the lug fastener 51 is able to be slid into the body 55 with the flange 53 being captured behind the front 67 of the body 55. Therefore the lug fastener 51 can only be lifted out the way it came in. The circular nature of the lug fastener 51 allows it to be inserted in any orientation.

A moveable carriage 68 and release button 69 are located within the receptacle body 55. The moveable carriage 68 is located totally within the body 55 and is reciprocally movable between a receiving position and a holding position while the release button 69 is partially located within the body 55 with a button portion 70 extending out from an aperture 71 in the bottom 72 of the body 55 with a release mechanism portion 73 being located within the body 55.

The moveable carriage 68 has a pair of holding arms 74 fitted to its body portion 75, the arms 74 extending upwardly, the arms 74 effectively forming a recess 76 between their free ends 77 into which the lug fastener 51 is received. The arms 74 are fitted by means of protrusions 78 partially fitting into corresponding arcuate slots 79 in the body portion 75 with a portion of the protrusions extending away from the body portion 75.

Each of the arms 74 have a pin 80 located at their free end 77, the pin 80 facing rearwardly and being located within a slotted guide 81 in the body 55. The slotted guides 81 are curved towards the centre line of the body 55 thus forcing the free ends 77 of the arms 74 towards each other as the carriage 68 is moved downwardly from the receiving position to the holding position.

The arms 74 each have a ramped flange 82 extending downwardly along its length, the ramped flanges 82 mating with a pair of inwardly facing stops 83 located in the body 55, the stops 83 preventing the carriage from moving out of the body 55.

The release button 69 also has a pair of lugs 84 which extend upwardly from the button portion 70 with the lugs 74 interacting with the flanges 82 of the arms 74 of the carriage 68. The lugs 74 each have an outwardly facing flange 85 which mates with a corresponding stop 86 in the body 55. These stops 86 prevent the release button 69 from inadvertently coming out of the body 55 through the aperture 71 as well as holding the flanges 82 when in the holding position. The lugs 84 when moved upwardly force the flanges 82 towards each other as the lugs 84 move along a ramp 87 on the flanges 82. This motion releases the flanges 82 from the stops 86 thus releasing the carriage 68 from the holding position. A pair of projections 88 on the carriage 68 and the release button 69, (not shown on the release button 69), respectively hold a coil spring 89 which extends between the carriage 68 and release button 69 which in turn urges the button 69 in the downwards direction and the carriage 68 in the upwards direction.

In use the lug fastener 51 is slid into the opening 64 of the body 55 with the stem of the lug fastener extending through the slot 66 while the device 50 is attached to a belt or the like. The flange 53 of the lug fastener 51 is effectively received within the recess 76 between the arms 74 with the indents 54 of the flange 53 mating with the protrusions 78 of the arms 74. At this stage, the flange 53 is abutting against the carriage 68 which forces the carriage 68 downwards. As the carriage 68 moves in this direction, the flanges 62 move towards the centre line due to the ramps 87 acting against the stops 83 and ramps 90 between the stops 83 and 86 until reaching the holding position when the flanges 82 are held by the stops 86 and thereby prevented from moving upwardly.

At the same time as the carriage 68 is being locked into the holding position, the free ends 77 of the arms 74 are moved by the action of the pins 79 in the slotted guides 81 thus effectively wrapping around the flange 53 of the lug fastener 51. Thus the lug fastener 51 is held in the device 50 and the carriage 68. The lug fastener 51 is restricted from rotating due to the protrusions 78 being captured in the indents 54 while it is in this holding position. This restriction to rotation does not prevent the lug fastener 51 being rotated as the protrusions 78 are flexible and are able to flex out of the way enough force is exerted.

In this embodiment the indents 54 are positioned 90° from each other and therefore the lug fastener 51 (and hence the phone) can take four different orientations. Naturally this arrangement can be different and any useful orientation can be arranged. As the lug fastener 51 is able to be rotated when sufficient force is applied, it generally can be moved to the orientation desired at any particular time by changing the positions of the four indents 54 with respect to the two protrusions 78.

To release the lug fastener 51, and hence the mobile phone from the device 50, the release button 69 is pushed against the action of the spring 89 forcing the flanges 82 towards each other as described above. This releases the carriage 68 from the holding position and the action of the spring 89 forces the carriage 68, and hence the phone, upwards with the lug fastener 51 being able to be removed from the device 50.

The foregoing describes only some embodiments of the present invention, and modifications obvious to those skilled in the art can be made thereto without departing from the scope of the present invention.

What is claimed is:

1. A device for the attachment of mobile phones or like apparatus to a belt or other garment of a user, said device including a receptacle body and corresponding flanged lug fastener which is attached to the mobile phone or like apparatus, said receptacle being adapted to be attached to a belt or the like by means of a clip means positioned on the receptacle body, said body having an opening located at its top side portion into which the flange of said lug fastener is received with the lug fastener extending through a slot on said receptacle body communicating with said opening such that said mobile phone or like apparatus is positioned outside and adjacent said receptacle body when said lug fastener is received within said receptacle body, wherein said device further includes a locking means within said receptacle body, said locking means having a movable carriage movable between a receiving position and a holding position, said carriage receiving said flange of said lug fastener when said movable carriage is in said receiving position, and said carriage having holding means to capture and hold said flange of said lug fastener within said carriage when said movable fastener is moved into said holding position, and wherein the holding means is a pair of pliable arms or articulated arms which are part of the carriage, the arms being forced around the lug fastener to prevent the lug fastener from moving out of the carriage.

2. The device according to claim 1, wherein the free ends of the arms are forced around the lug fastener as the carriage moves from the receiving position to the holding position due to pins in the arms moving within a slotted track in the receptacle body.

3. A device for the attachment of mobile phones or like apparatus to a belt or other garment of a user, said device including a receptacle body and corresponding flanged lug fastener which is attached to the mobile phone or like apparatus, said receptacle being adapted to a belt or the like by means of a clip means positioned on the receptacle body, said body having an opening located at its top side portion into which the flange of said lug fastener is received with the lug fastener extending through a slot on said receptacle body communicating with said opening such that said mobile phone or like apparatus is positioned outside and adjacent said receptacle body when said lug fastener is received within said receptacle body, wherein said device further includes a locking means within said receptacle body, said locking means having a movable carriage movable between a receiving position and a holding position, said carriage receiving said flange of said lug fastener when said movable carriage is in said receiving position, and said carriage having holding means to capture and hold said flange of said lug fastener within said carriage when said movable fastener is moved into said holding position, wherein the holding means prevents the flange from rotating, and wherein the holding means is a pair of pliable arms which are part of the carriage, the arms having protrusions which engage with indents in the flange of the lug fastener thus restricting rotational movement of the lug fastener as well as restricting the lug fastener from moving out of the carriage.

4. The device according to claim 3, wherein the free ends of the arms are forced around the lug fastener as the carriage moves from the receiving position to the holding position due to pins in the arms moving within a slotted track in the receptacle body, thus capturing the lug fastener.

5. The device according to claim 4, wherein the locking means further includes a release means which releases the moveable carriage from the holding position.

6. The device according to claim 5, wherein the carriage is locked in the holding position by a flange and stop means which engage when in the holding position, the carriage being released by the release means which consists of an external button communicating through an opening in the body, the release means being manipulated to force the flange and stop means from their engagement.

* * * * *